(12) United States Patent
Potrebic et al.

(10) Patent No.: US 7,088,910 B2
(45) Date of Patent: Aug. 8, 2006

(54) OPTIMIZING USE OF STORAGE SPACE IN A VIDEO DATA RECORDING SYSTEM

(75) Inventors: Peter J. Potrebic, Calistoga, CA (US); Steven M. Horowitz, Los Altos, CA (US); Geoffrey R. Smith, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1148 days.

(21) Appl. No.: 09/781,111

(22) Filed: Feb. 9, 2001

(65) Prior Publication Data

US 2002/0110353 A1    Aug. 15, 2002

(51) Int. Cl.
*H04N 7/025* (2006.01)
*H04N 5/91* (2006.01)

(52) U.S. Cl. .............................. 386/83; 386/95; 386/96; 725/32; 725/33; 725/34

(58) Field of Classification Search .................. 386/96, 386/83, 95; 345/721; 725/38–40, 44, 52; 348/561
See application file for complete search history.

(56) References Cited

U.S. PATENT DOCUMENTS

| | | | | |
|---|---|---|---|---|
| 4,706,121 A | * | 11/1987 | Young | 348/27 |
| 5,623,344 A | | 4/1997 | Lane et al. | 386/81 |
| 6,208,799 B1 | * | 3/2001 | Marsh et al. | 386/83 |
| 6,288,989 B1 | | 9/2001 | Ro et al. | 369/47.13 |
| 6,323,911 B1 | * | 11/2001 | Schein et al. | 348/552 |
| 6,642,939 B1 | * | 11/2003 | Vallone et al. | 715/721 |
| 6,756,997 B1 | * | 6/2004 | Ward et al. | 715/716 |
| 2002/0040475 A1 | * | 4/2002 | Yap et al. | 725/39 |

FOREIGN PATENT DOCUMENTS

| | | |
|---|---|---|
| EP | 0 705 036 | 4/1996 |
| EP | 0936 811 | 8/1999 |
| JP | 10341381 | 12/1998 |

* cited by examiner

*Primary Examiner*—Thai Tran
*Assistant Examiner*—Jamie J Vent
(74) *Attorney, Agent, or Firm*—Workman Nydegger (57) ABSTRACT

Systems and methods for optimizing the use and availability of storage space in a video data recording system. An intelligent disk recording and management system selectively assigns tags to determine the manner and/or priority of recording programs onto a storage device and the priority of maintaining the programs on the storage device once the programs are recorded. The tags are automatically assigned based on known user preferences or are assigned by the viewer, and can be modified once a program is replayed. The tags allow the system to automatically determine whether or not to record over a previously recorded program and which previously recorded program to record over so as to allow the storage device to be more efficiently and optimally used. The system further includes an interface that provides improved assistance and explanations that relate to the recording of programs and the maintaining of the recorded programs on the storage device.

29 Claims, 5 Drawing Sheets

FIG. 1

FIG. 2 — Monday (80)

| Channel | 5:00 | 5:30 | 6:00 | 6:30 | 7:00 | 7:30 |
|---|---|---|---|---|---|---|
| 26 | Real People | Frasier | Local News | Mash | Taxi | Square Pegs |
| 27 | The Simpsons | News | | Little House | | Extra |
| 28 | Friends | Lonesome Dove | | | | Bonnie Clyde |
| 29 | Nova | | Nature | | Frontline | |

FIG. 3 — Tuesday (90)

| Channel | 5:00 | 5:30 | 6:00 | 6:30 | 7:00 | 7:30 |
|---|---|---|---|---|---|---|
| 26 | This Life | Facts of Life | Local News | Mash | Keepers | Twilight Zone |
| 27 | The Simpsons | News | | Little House | | Extra |
| 28 | Friends | Lonesome Dove | | | | Bonnie Clyde |
| 29 | JAG | | The Count of Monte Cristo | | | |

FIG. 4 — Wednesday (100)

| Channel | 5:00 | 5:30 | 6:00 | 6:30 | 7:00 | 7:30 |
|---|---|---|---|---|---|---|
| 26 | Cosby | Hardball | Local News | Mash | Neighbors | Friends |
| 27 | The Simpsons | News | | Little House | | Extra |
| 28 | Friends | Lonesome Dove | | | | Bonnie Clyde |
| 29 | Nova | | Nature | | Father Murphy | |

OPTIMIZING USE OF STORAGE SPACE IN A VIDEO DATA RECORDING SYSTEM

BACKGROUND OF THE INVENTION

1. The Field of the Invention

The present invention relates to systems and methods for optimizing the use and availability of storage space. More specifically, the present invention is directed to systems and methods for selectively and intelligently tagging programs that a viewer desires to have recorded on a storage device to indicate the manner or priority for recording the programs in order to optimize the use of the storage space, and for selectively and intelligently eliminating programs that have been recorded to optimize the availability of the storage space.

2. The Prior State of the Art

Home entertainment systems are able to receive a variety of different programming channels from various sources at any time of the day or night. The channels carry public, cable and/or satellite television programming. When a viewer desires to record a program, the viewer usually programs a videocassette recorder ("VCR"), a digital video recorder ("DVR"), or another recording system of the home entertainment system to record the program.

When a VCR is used to record a program, the viewer supplies a videocassette and determines where on the videocassette the program is to be recorded. If other programs have been recorded on the videocassette so that an insufficient amount of space is available, the viewer obtains another videocassette that has sufficient space available, records over one or more of the previously recorded programs, or chooses to not record the program. Frequently, the viewer is unsure of what has been previously recorded and therefore must manually scan the videocassette to determine what has been recorded, which can be a time consuming process. Often, a new videocassette is obtained to record the desired program. As such, it is common for a viewer to obtain over time a collection of videocassettes upon which the viewer is uncertain as to what has been recorded. The collection is rarely reduced, as viewers normally do not take the time to determine which programs are not needed, and can be recorded over in order to eliminate the amount of storage space used to store recorded programs.

When a DVR is used to record a program, a storage disk is used that generally is internal to the system, thereby eliminating the clutter of videocassettes. However, since the amount of storage space available on a disk is limited, the disk can become full. As such, once all of the disk space has been used for recording programs, the viewer must still manually determine from the recorded programs which programs can be erased or recorded over to free up space on the disk for the recording of new programs. As with the VCR, this manual process is time consuming and can result in programs being inadvertently recorded over.

SUMMARY OF THE INVENTION

The present invention relates to systems and methods for optimizing the use and availability of storage space. More specifically, the present invention is directed to systems and methods for selectively and intelligently tagging programs that a viewer desires to have recorded on a storage device to indicate the manner or priority for recording the programs in order to optimize the use of the storage space, and for selectively and intelligently eliminating programs that have been recorded to optimize the availability of storage space.

Implementation of the present invention relates to the use of an intelligent disk recording and management system that places tags on programs to determine the manner and/or priority of recording the programs onto a storage device and the priority of maintaining the programs on the storage device once the programs are recorded. The tags are automatically assigned based on known user preferences or are assigned by the viewer. Therefore, based on the tag assigned, the system will guarantee the recording of a program or will only record a program when sufficient recording space is available. Alternatively, based on the tag assigned, a program is recorded over a previously recorded program having a tag with the same or an inferior priority when the storage space is full. As such, a program having a priority of 1 can be recorded over stored programs having either a priority of 1 or a lower priority, such as 2. In contrast, a program having the lower priority of 2 will not be recorded if doing so would require the deletion of a program having the higher priority of 1. The priority of a program can be changed after it has been replayed so that it is more likely to be deleted than other recorded programs that have not yet been viewed.

Once recorded, the intelligent disk recording and management system selectively maintains the programs on the storage device through the use of tags that identify the programs. The tags enable the recorded programs to be prioritized, which allows the system to automatically determine whether or not to record over a previously recorded program and which previously recorded program to record over, thereby allowing the storage device to be more efficiently and optimally used. Therefore, depending on the tag assigned to the recorded program, the recorded program will not be deleted prior to a "save until" date. In accordance with another tag that is assignable, the viewer designates a "bucket size" that can be allocated to a particular program, such as a repeating program having multiple episodes that are to be recorded. The bucket size designation ensures that a repeating program does not fill a disproportionate amount of disk space and yet allows for a minimum number of episodes to be maintained once the bucket size is met. Tags also may be used for identifying whether a program is only partially recorded and can be used to identify which portion of a recorded program has been viewed, so that the partial programs and previously viewed portions can be recorded over to create space to record new programs.

The intelligent disk recording and management system further includes an interface that allows a viewer to be informed as to recording and/or management operations. The interface informs the viewer as to the amount of recording storage space that is available, when and why a recorded program was deleted or recorded over, which programs are only partially recorded, and why an entire program was not recorded. As such, the interface provides improved assistance and explanations to a viewer that relate to the recording of programs and the maintaining of recorded programs on a storage device. Any or all of the foregoing program recording and disk management techniques can be combined as desired.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both systems and methods for optimizing the use and availability of storage space. More specifically, the present invention is directed to systems and methods for selectively and intelligently tagging programs that a viewer desires to have recorded on a storage device to indicate the manner or priority for recording the programs in order to optimize the use of the storage space, and for selectively and intelligently eliminating programs that have been recorded to optimize the availability of storage space.

Embodiments of the present invention are associated with an intelligent disk recording and management system that selectively assigns tags to determine the manner and/or priority of recording programs onto a storage device and to determine the priority of maintaining the programs on the storage device once the programs are recorded. The tags are automatically assigned based on known user preferences or are assigned by the viewer, and can be modified once a program is replayed. The tags allow the system to automatically determine whether or not to delete or record over a previously recorded program and which previously recorded program to delete or record over so as to allow the storage device to be more efficiently and optimally used. The system further includes an interface that provides improved assistance and explanations that relate to the recording of programs and the maintaining of the recorded programs on the storage device.

The following disclosure of the present invention is grouped into three subheadings, namely "Exemplary Operating Environment," "Pre-Recording Storage Optimization," and "Post-Recording Storage Optimization." The utilization of the subheadings is for the convenience of the reader only and is not to be construed as limiting in any sense.

Exemplary Operating Environment

As provided above, embodiments of the present invention are associated with an intelligent disk recording and management system that selectively assigns tags to determine the manner and/or priority of recording programs onto a storage device and to determine the priority of maintaining the programs on the storage device once the programs are recorded. The system includes an interface that provides viewers with improved assistance and explanations relating to the recording of programs and the maintaining of the recorded programs on the storage device. Embodiments of the present invention may comprise a special purpose or general purpose computer including various computer hardware, as discussed in greater detail below. Set top boxes that enhance the capabilities of conventional televisions represent an example of a special purpose computer. The embodiments may further comprise multiple computers linked in a networked environment.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein.

The particular sequence of such executable instructions or associated data structures represents examples of corresponding acts for implementing the functions described in such steps.

Figure 1:
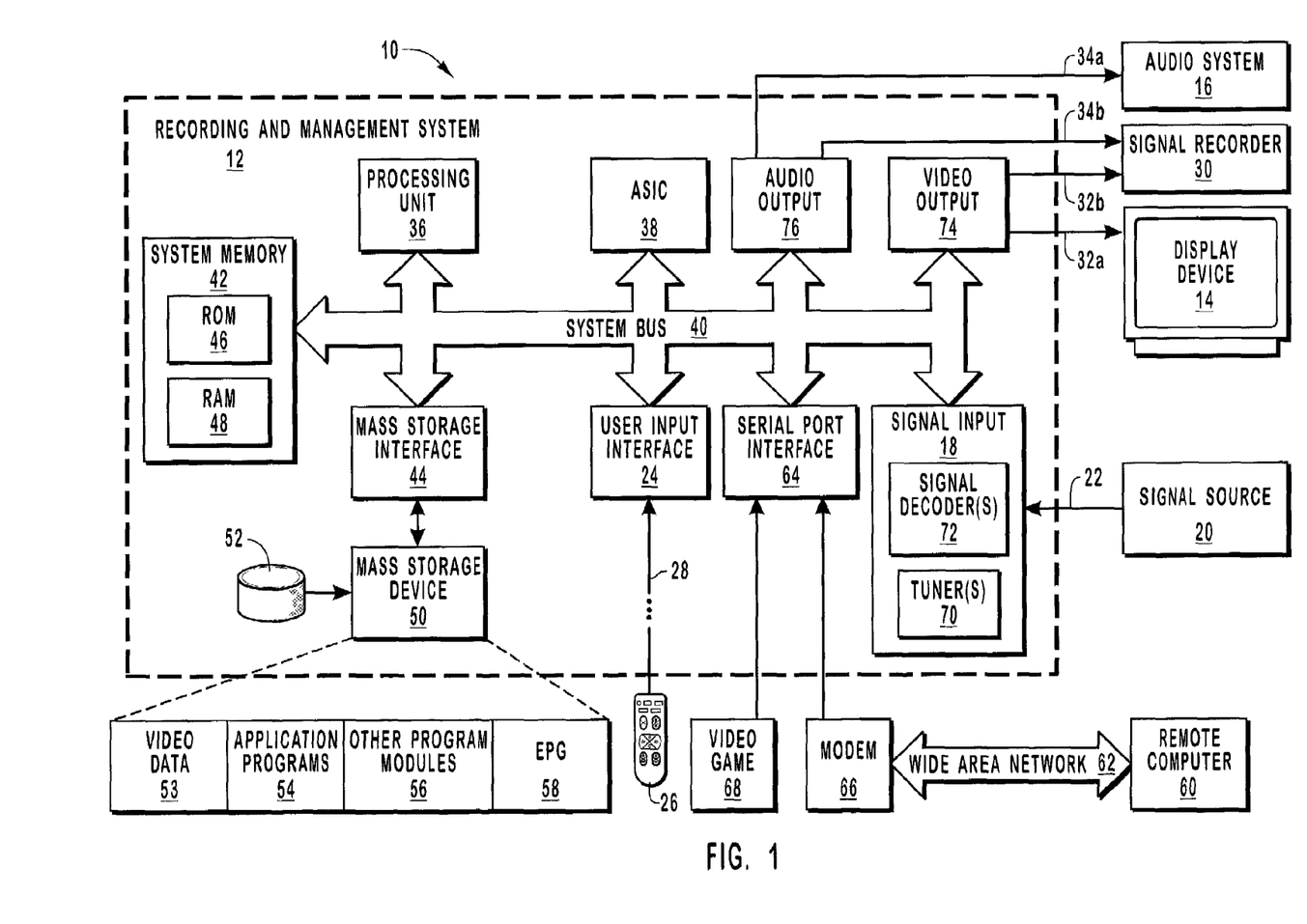
FIG. 1 illustrates an exemplary system that provides a suitable operating environment for the present invention.

FIG. 1 and the corresponding discussion are intended to provide a general description of a suitable environment in which the invention may be implemented. In the discussion, reference is made to a home entertainment system that may be used for displaying and/or recording programming. For purposes of this description and in the claims, a "home entertainment system" may be a display unit, such as a television screen, coupled to a processing device for performing the data processing steps disclosed herein, or may include any number of interconnected consumer electronic devices, one of which having a processing device for performing the data processing steps disclosed herein. Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a set-top box that serves as an Internet terminal, and any other device capable of processing data as described herein. Furthermore, the term "home entertainment system" is to be understood as a term that broadly describes a television-viewing environment, whether it is located in a viewer's home, at a place of business, in the public, or at any other location. Also for purposes of this description and in the claims, the term "programming" includes both the viewable portions of moving image data and its associated sound data.

In one embodiment, the present invention is implemented in a system that uses a conventional television screen or other display unit to display information and includes a WebTV® set-top box or a similar Internet terminal that has been adapted to perform the operations that include composing, sending and receiving email, browsing the World Wide Web ("Web"), accessing other segments of the Internet, and otherwise displaying information. An Internet terminal typically uses standard telephone lines, Integrated Services Digital Network (ISDN) lines, cable lines associated with cable television service, or the like to connect to the Internet or other wide area networks.

FIG. 1 illustrates a home entertainment system 10 that includes a recording and management system 12, a display device 14 and an audio system 16. System 12 may be a set-top box or Internet terminal that has been adapted to perform the operations disclosed herein, and may be integrally positioned with or separate from display device 14, which may be a high definition television display, a standard television display, a flat panel display, a projection device, a high definition television display, a computer monitor, or any other device capable of displaying viewable video image data. Audio system 16 may be a speaker, a stereo system, or any device capable of emitting sound data, and similarly may be integrally positioned with or separate from display device 14.

System 12 includes a signal input 18, which receives programming from a signal source 20. The programming is transmitted from signal source 20 to signal input 18 via a programming input line 22, which can be a cable or optic connection, a terrestrial antenna system, a satellite system, or any device or system capable of transmitting programming to system 12.

The signal source 20 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF or VHF), and the like.

While FIG. 1 illustrates home entertainment system 10 as having a single programming input line 22 and a single signal source 20, there can instead be a plurality of programming input lines that transmit programming from a plurality of signal sources. In such embodiments, the home entertainment system may receive the programming from one signal source or from a plurality of signal sources at one time.

System 12 also includes a user input interface 24, which receives input from an input device 26, such as a remote control, keyboard, microphone, or any other device capable of generating electronic instructions for system 12. Input device 26 is communicatively coupled to system 12 over an input link 28 so as to enable such control. Input device 26 generates electronic instructions over input link 28 in response to preprogrammed data or in response to a viewer pressing buttons on input device 26. Input device 26 may also control Web browser software within system 12 as when system 12 is a set-top box or an Internet terminal that has been adapted to perform the operations disclosed herein. For instance, input device 26 may be programmed to turn on home entertainment system 10 and to tune system 12 to a channel.

FIG. 1 illustrates a signal recorder 30, which is capable of receiving video and/or audio data and recording the data on a storage medium. Video signals are transmitted to signal recorder 30 and/or display device 14 by video image link 32, examples of which include a radio-frequency ("RF") link, an S-video link, a composite link, or any other equivalent form of video image link. Similarly, audio link 34 transmits audio data from system 12 to audio system 16 or to signal recorder 30.

The operation of system 12 is controlled by a central processing unit ("CPU"), illustrated as processing unit 36, which is coupled to an application-specific integrated circuit ("ASIC") 38 and uses computer-executable instructions implemented in software and/or hardwired logic circuitry. Processing unit 36 and ASIC 38 are coupled via a system bus 40, which also interconnects various other system components, such as the system memory 42, mass storage interface 44, user interface 24 and signal input 18. Processing unit 36 executes software designed to implement features of system 12 including features of the present invention. ASIC 38 contains circuitry that is used to implement certain functions of system 12. Instructions, data, and other software necessary for the operation of processing unit 36 and ASIC 38 may be stored in the system memory 42, such as in read-only memory ("ROM") 46, in random-access memory ("RAM") 48, and/or in a mass storage device 50, which is coupled to mass storage interface 44. ROM 46, RAM 48 and mass storage device 50 are communicatively coupled to ASIC 38 so as to be readable by ASIC 38 and so that data may be written from ASIC 38 to RAM 48 and possibly mass storage device 50.

Mass storage device 50 may be a magnetic hard disk 52 or any other magnetic or optical mass memory device that is capable of storing large amounts of data. Any desired computer-readable instructions or data, including application programs 54, other program modules 56, and an electronic programming guide ("EPG") 58, which specifies the broadcast times and channels of programs can be stored in mass storage device 50. Mass storage device 50 can also be used to record video data 53, in which case, system 12 generates as a digital video recorder.

Application programs 54 can include an interface program that indicates to a viewer the current state of a storage device and informs the viewer as to actions performed by system 12. By way of example, when mass storage device 50 is used as a digital video recorder, the interface program may provide a pie graph or some other graphical or textual representation on display device 14 as to the amount of storage space that has been used on mass storage device 50 and how much is available. Furthermore, the interface program may inform the viewer as to why a requested program was not recorded, was only partially recorded, was deleted, etc. The interface program may also inform the viewer of which recorded programs will be deleted, inform the viewer of all of the programs that have been recorded on mass storage device 50, and/or inform the viewer of the status of each of the recorded programs.

EPG data may be obtained in a variety of manners. For instance, the EPG data can be supplied to system 12 by a remote computer 60, such as a server, and stored on mass storage device 50. The EPG data is supplied on a regular basis to continually maintain a current schedule of programming at the system 12. Where system 12 is associated with the Internet, the data included in the EPG may be downloaded from the Internet. Alternatively, the EPG may be delivered to the system 10 by using a direct-dial communication over standard telephone lines, or by using data transmission over the cable television infrastructure, a satellite network, an over-the-air broadcasting or any other available medium.

Figure 2:
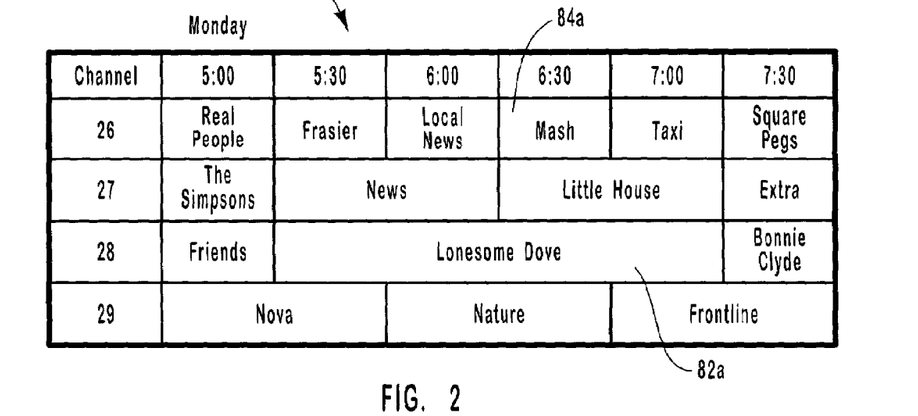
FIG. 2 illustrates a portion of an exemplary electronic programming guide that relates to Monday programming and may be used in association with the operating environment of FIG. 1.
Figure 3:
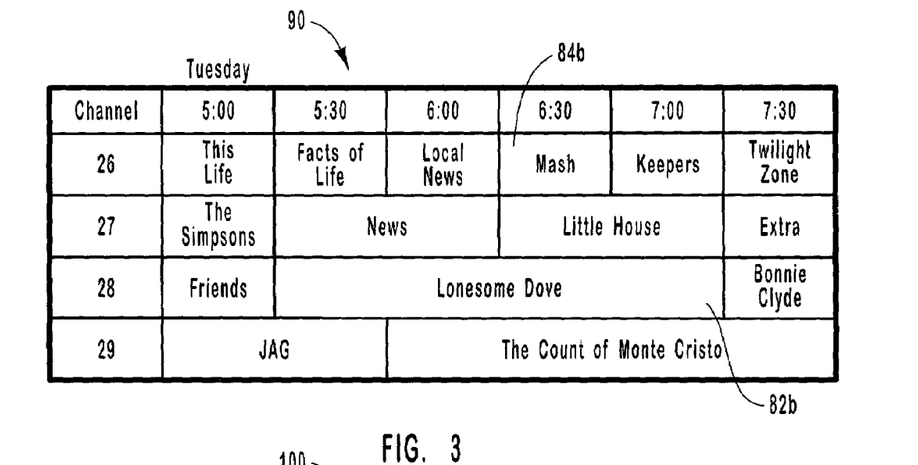
FIG. 3 illustrates a portion of an exemplary electronic programming guide that relates to Tuesday programming and may be used in association with the operating environment of FIG. 1.
Figure 4:
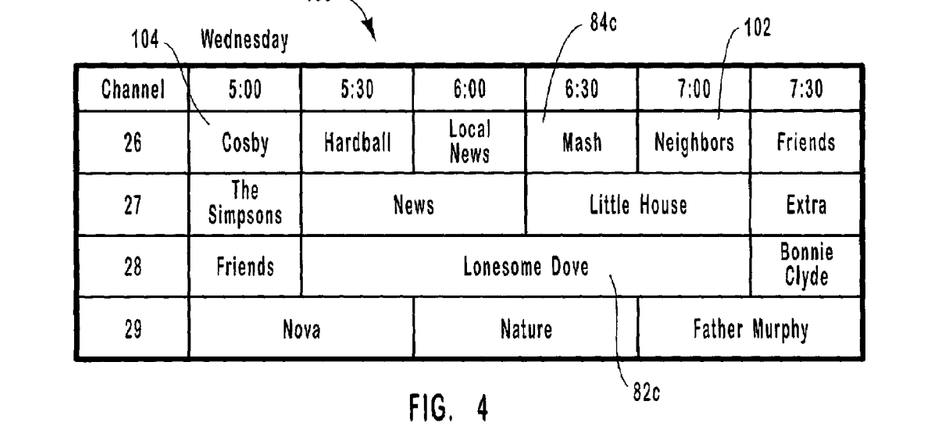
FIG. 4 illustrates a portion of an exemplary electronic programming guide that relates to Wednesday programming and may be used in association with the operating environment of FIG. 1.

FIGS. 2, 3 and 4 provide exemplary portions of an EPG, such as EPG 58 of FIG. 1, for three consecutive days, respectively a Monday, Tuesday and Wednesday. Each EPG portion includes the scheduled start time for the programming listed and the channel on which the programming is scheduled to air, as will be further explained below.

Referring back to FIG. 1, in the embodiment where system 12 is associated with the Internet, system 12 communicates with a remote computer 60 via a wide area network ("WAN") 62 by including a serial port interface 64 that is interposed between the system bus 40 and a modem 66, a wireless link, or other means for establishing communications over a WAN that may be internal or external to system 12. Management device 12 is also capable of transmitting information via the Internet by direct-dial communication over standard telephone lines, or by using any other available communication medium.

While serial port interface 64 may be utilized to connect a modem 66 for communicating across a WAN, serial port interface 64 may also be utilized to connect other consumer electronic devices, such as video game 68, and/or various input devices, such as a keyboard (not shown) or joystick (not shown), to system 12.

Referring now to signal input 18, if the signal on programming input line 22 23 includes multiple channels, a tuner 70 included in signal input 18 tunes to a selected channel in the signal. Multiple tuners 70 can be used to provide enhanced viewing features, such as picture-in-picture, recording one channel while viewing another, and recording a plurality of channels simultaneously. A signal decoder 72 converts video data from an analog format to a digital format, or from a digital format to an analog format, in the event that ASIC 38 and tuner 70 employ different formats. Video decoder 72 also decodes video data from a compressed video format (e.g. MPEG). In embodiments where the system 12 includes multiple tuners 70, system 12 may also include multiple signal decoders 72 to perform the operations disclosed herein.

System 12 also includes a video output 74, which may include a video encoder and/or a video converter. The video encoder assigns a code to frames of video data that are transmitted across a video image link 32 and switches between analog and digital formats as necessary. Similarly, audio output 76 can include an audio converter to provide the necessary switching between analog and digital formats.

While FIG. 1 and the corresponding discussion above provide a general description of a suitable environment in which the invention may be implemented, it will be appreciated that the features of the present invention disclosed herein may be practiced in association with a variety of different system configurations.

Pre-Recording Storage Optimization

Tags are placed on programs that a viewer desires the system to record to determine the manner and/or priority of recording the programs onto a storage device, thus optimizing the use of the available storage space. The tags may be automatically assigned by the system based on known viewer preferences, or may be assigned by a viewer.

Examples of tags used to optimize the use of available storage space include guaranteed tags, optional tags and prioritization tags. A guaranteed tag is an identifier that causes recording space on a storage device to be reserved for the recording of a requested program corresponding to the guaranteed tag. The recording space is reserved at the time of request as opposed to the time at which the requested program is broadcast. An optional tag allows a program to be recorded if at the time the program is broadcast there is a sufficient amount of recording space available on the storage device. Therefore, if there is insufficient recording space at the time the requested program is broadcast, the program is not recorded and a viewer is notified that the program was not recorded because of insufficient recording space. A prioritization tag allows for a program having a higher priority to be recorded over another program having the same priority or a lower priority. Also, when recording space is limited, a program having a higher prioritization tag may be recorded instead of another program having a lower priority. Examples of guaranteed tags, optional tags and prioritization tags will be provided below.

With reference to FIGS. 2–4, exemplary EPG portions are provided for three consecutive days, namely a Monday, Tuesday and Wednesday. The portions are respectively labeled as EPG portions 80, 90 and 100. Each EPG portion includes the scheduled start time for the programming listed and the channel on which the programming is scheduled to air. A viewer may request one or more of the programs to be automatically recorded by the system.

Figure 5:
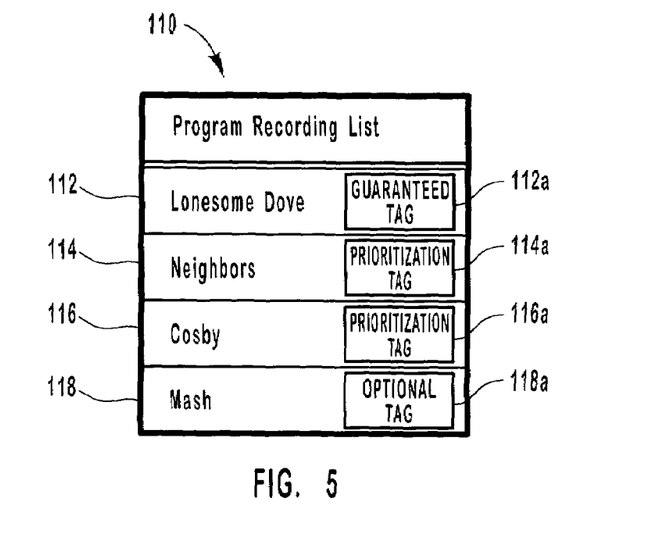
FIG. 5 illustrates an exemplary program recording list that indicates the programs that a viewer has requested to be recorded, where each program is assigned an appropriate tag.

Upon a viewer requesting a program to be recorded, the requested program is included on a list of programs that a viewer desires the system to record and a tag is assigned. An example of such a list is illustrated in FIG. 5 as program recording list 110, which includes programs 112–118. In the illustrated example, program 112, entitled "Lonesome Dove," is a mini-series that is to be aired over three consecutive days, as illustrated in FIGS. 2–4 by programs 82a, 82b, and 82c. Program 114 is entitled "Neighbors" and is scheduled to be broadcast on Wednesday at 7:00, as illustrated by program 102 of FIG. 4. Similarly, program 116, entitled "Cosby," will air on Wednesday at 5:00, as illustrated by program 104 of FIG. 4. Program 118 is entitled "Mash" and is scheduled to have an episode air Monday through Wednesday at 6:30, as illustrated in FIGS. 2–4 by programs 84a, 84b, and 84c. The tags assigned to the programs may be assigned by the system as a default setting, by a viewer, or by the system based on known user preferences. The assigned tags are illustrated in FIG. 5 as tags 112a–118a.

If a tag corresponding to program 112 of FIG. 5, is a guaranteed tag, the system reserves sufficient space on the storage device to record program 112 at the time the request is made to record the program. Therefore, when the viewer requests the recording of Lonesome Dove, program 112 is placed on list 110 of FIG. 5, a guaranteed tag 112a is assigned, and the system determines whether there is sufficient storage space to record the program. As indicated in FIGS. 2–4 by programs 82a, 82b and 82c, six hours of programming would be required to record Lonesome Dove. Therefore, if six hours of recording space is available on the storage device, the six hours of space is reserved on the storage device and when the program airs it is recorded in the reserved location. Alternatively, if six hours of storage space is unavailable, the system informs the viewer that there is not enough storage space available on the storage device. The viewer may then change the type of tag on program 112, make more space available on the storage device to allow for six hours of recording, or choose not to record Lonesome Dove.

If "Mash" was a program that included episodes that a viewer wanted to watch, but could afford missing, the viewer may request the system to record the program. Mash would then be placed on program recording list 110, as indicated by program 118 of FIG. 5, and an optional tag 118a may be assigned. Optional tag 118a causes the episodes of Mash to be recorded if there is sufficient available space on the storage device to record the program at the time the episodes air. The first episode is scheduled to air on Monday at 6:30, as illustrated by program 84a of FIG. 2. If at 6:30 on Monday there is sufficient storage space to record the program, the system will record program 84a. Otherwise, the interface program will notify the viewer that there was insufficient storage space to record the program and thus program 84a was not recorded.

Similarly, at 6:30 on Tuesday if there is sufficient storage space to record program 84b, the system will record the program. Otherwise, the interface program will notify the viewer that there was insufficient storage space to record the program 84b. Likewise at 6:30 on Wednesday if there is sufficient storage space to record program 84c, the system will record the program. Otherwise, the interface program will notify the viewer that there was insufficient storage space to record the program 84c.

If the tags assigned to programs 114 and 116 are prioritization tags assigned and there is sufficient space on the storage device to record both programs, each will be recorded at the time it is broadcast. However, if there is only enough space to record one of the programs, and if prioritization tag 114a has a lower priority (i.e. priority=2) than prioritization tag 116a (i.e. priority=1), program 116 will be recorded on the storage device because it had a higher priority. Therefore, when there is insufficient space to record all of the programs having a prioritization tag, the programs are recorded when they air according to the priority assigned.

Figure 6:
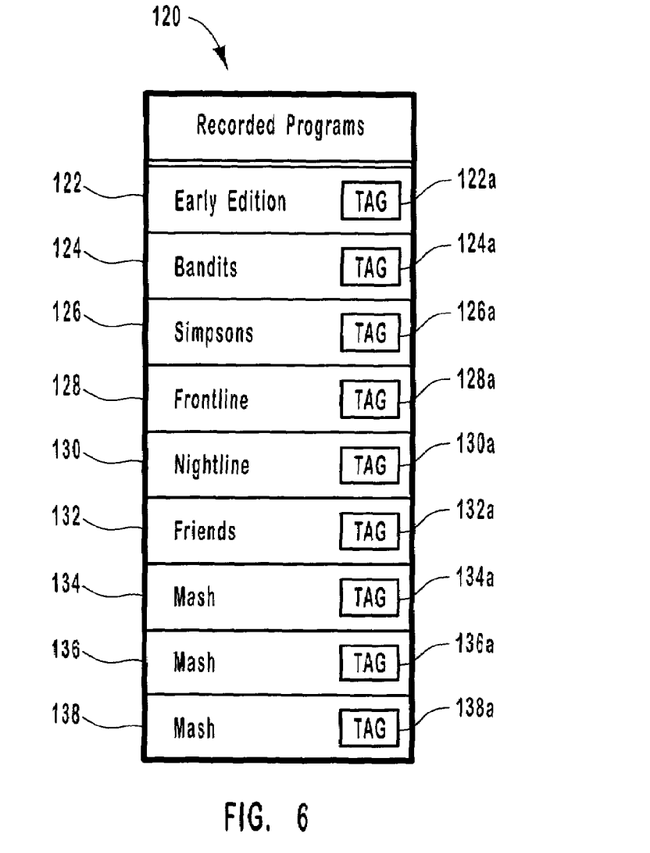
FIG. 6 illustrates an exemplary listing of programs that have been recorded on a storage device, each program having a corresponding tag assigned.

Prioritization tags can also be used to allow a program to be recorded over a previously recorded program having a tag with the same or an inferior priority when the storage space is full. Therefore, with reference to FIGS. 5 and 6, where FIG. 5 illustrates a list of programs that a viewer desires to have recorded (program recording list 110) and FIG. 6 illustrates a list of programs that have been recorded (recorded programs list 120), a program, such as program 116, having a priority of 1 can be recorded over one or more of the programs on recorded programs list 120 having either a priority of 1 or a lower priority, such as 2. In contrast, a program, such as program 114, having the lower priority of 2 will not be recorded if doing so would require the deletion of a program from the recorded programs list 120 having the higher priority of 1. The priority of a program can also be changed after it has been replayed so that it is more likely to be deleted than other recorded programs that have not yet been viewed.

A tag may also include a temporary priority or a "save until" feature that allows the system or the viewer to designate when the corresponding program will be available for deletion from the storage device. Therefore, if the save until date is three days after it airs, the viewer has three days after the program is recorded to watch the program before the space used to record the program is made available to record a new program. Alternatively, the deletion date may be an infinite date to store the program indefinitely, causing a manual overwrite to be used to delete the recorded program.

A tag may also correspond to a bucket size. In one embodiment the bucket size allows for up to a defined number of related programs or episodes to be stored on a storage device at a given time. Therefore, if a bucket size of three was created for the program entitled "Mash" and three episodes of Mash have been recorded on the storage device, illustrated in FIG. 6 as programs 134–138, and the recording of another episode is desired, as illustrated by program 118 of FIG. 5, the episodes are replaced on a first-in-first-out basis. Therefore, a new episode replaces the oldest previously recorded episode on the storage device, as will be further explained below.

Alternatively, in another embodiment the bucket size is defined by the duration of the related programs or episodes. Therefore, if two hours of programming was allocated as the bucket size for the episodes of "Mash," and each episode was thirty minutes in length, program 118 of FIG. 5 could be recorded onto the storage device without having to eliminate any of programs 134–138 of FIG. 6. The combination of programs 134–138 of FIG. 6 and program 118 of FIG. 5 would equate to the maximum allotment of two hours of programming. Once another episode of Mash was to be recorded, a previously recorded episode would need to be eliminated to insure that the established bucket size was not exceeded.

Figure 7:
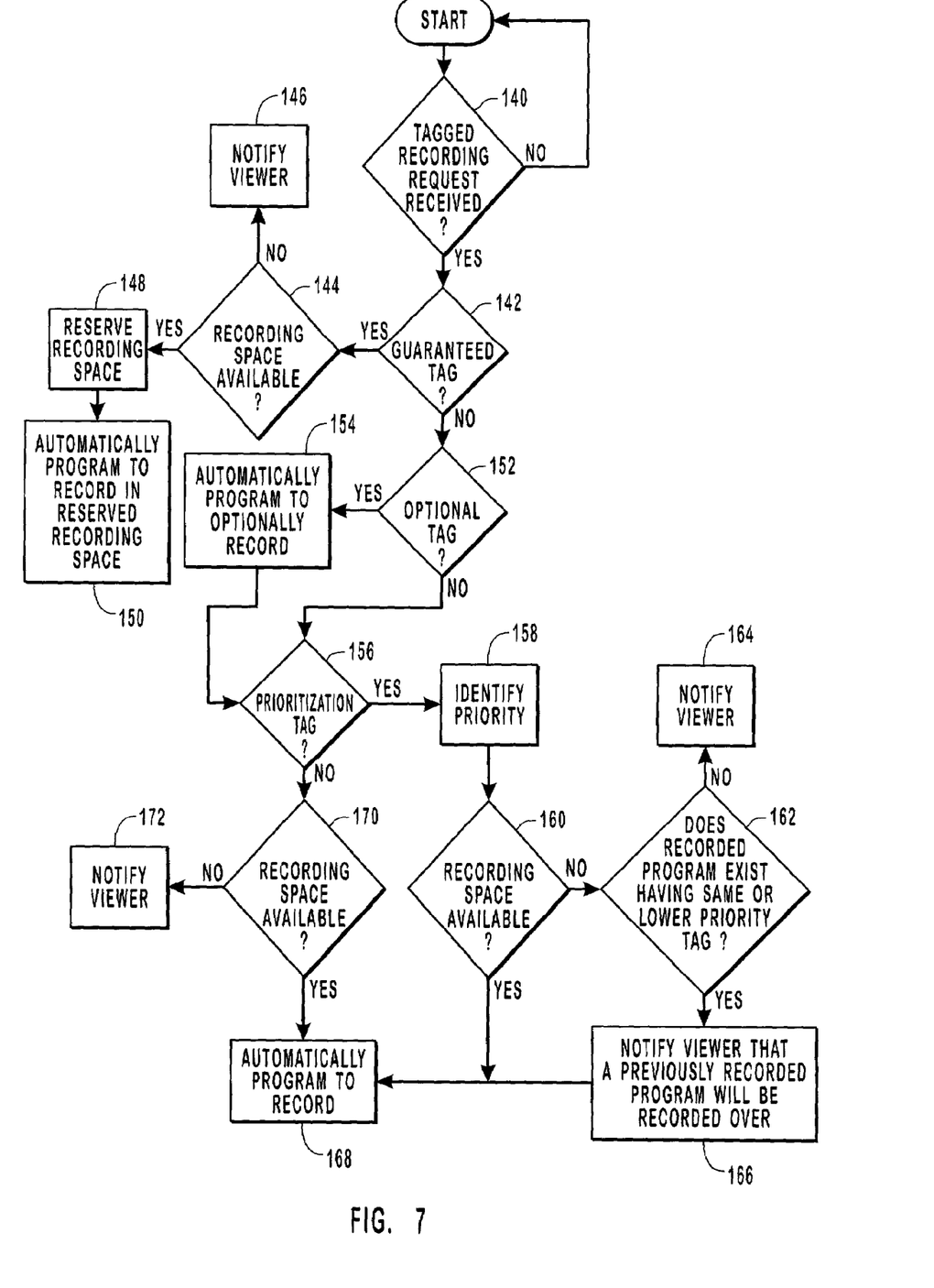
FIG. 7 is a flow chart that illustrates an exemplary embodiment of the present invention for optimizing the use of recording storage space prior to recording a requested program.

Referring now to FIG. 7, a flow chart is illustrated that provides an exemplary embodiment of the present invention for optimizing the utilization of available storage space for recording programs. Furthermore, the embodiment provides an example of applying recording rules to tags to determine whether a request to record a program is to be fulfilled.

In FIG. 7, execution begins at decision block 140 where a determination is made as to whether or not a tagged recording request has been received by the system. If no tagged recording request has been received by the system, execution returns back to start. Alternatively, if a tagged recording request has been received by the system, execution proceeds to decision block 142 for a determination as to whether or not the tag is a guaranteed tag. As provided above, a guaranteed tag is an identifier that indicates that recording space on the storage device should be reserved for the requested program corresponding to the guaranteed tag. The reservation on the storage space is placed at the time of the request as opposed to at the time at which the requested program is broadcast.

Therefore, if at decision block 142 it is determined that the tag is a guaranteed tag, execution proceeds to decision block 144.

At decision block 144, a determination is made as to whether or not sufficient recording space is available on the storage device. If it is determined that recording space is available or if an insufficient amount of storage space is available on the storage device, the viewer is notified by the system at step 146 that insufficient space is available on the storage device in order to guarantee the recording of the requested program. Alternatively, if it is determined at decision block 144 that sufficient recording space is available to record the requested program, the system automatically reserves the necessary recording space on the storage device at step 148 to record the desired program and the system is automatically programmed at step 150 to record the requested program in the reserved recording space once the program is broadcast.

Returning back to decision block 142, if it is determined that the tag is not a guaranteed tag, execution proceeds to decision block 152 for a determination as to whether or not the tag is an optional tag. As explained above, an optional tag allows a program to be recorded if at the time the program is broadcast there is sufficient recording space available on the storage device. Therefore, if there is insufficient recording space on the storage device at the time the requested program is broadcast, the program is not recorded and a viewer is notified that the program was not recorded because of insufficient recording space. Hence, if it is determined at decision block 152 that the tag is an optional tag, execution proceeds to step 154, where the system is automatically programmed to optionally record the requested program when the program is broadcast, which includes informing a viewer if the program is not recorded due to insufficient recording space. Execution then proceeds to decision block 156.

Returning back to decision block 152, if it is determined that the tag corresponding to the recording request is not an optional tag, execution proceeds to decision block 156 for a determination as to whether or not the tag is a prioritization tag. As explained above, a prioritization tag allows a program having a higher priority to be recorded over another program having the same priority or a lower priority. Furthermore, when recording space is limited, a program having a higher prioritization tag may be recorded instead of another program having a lower priority. Therefore, if it is determined at decision block 156 that the tag is a prioritization tag, execution proceeds to step 158 for the identification of the priority.

Once the priority is identified, a determination is made at decision block 160 as to whether or not sufficient recording space is available to record the program without having to record over a previously recorded program. If there is an insufficient amount of available recording space, execution proceeds to decision block 162 for a determination as to whether or not one or more programs that were previously recorded on the storage device have the same or a lower priority when compared to the prioritization tag of the desired program, so that the desired program can be recorded over the previously recorded programs. If it is determined at decision block 162 that no recorded program has the same or a lower priority as the desired program, a viewer is notified at step 164 that the program cannot be recorded because of insufficient storage space.

Alternatively, if it is determined at decision block 162 that one or more programs exist having the same or a lower priority as the desired program, execution proceeds to step 166 to notify a viewer that a previously recorded program with the same or a lower priority will be recorded over in order to create the necessary recording space to record the desired program, and the system is automatically programmed to record the desired program at step 168. Returning back to decision block 160, if it is determined that sufficient recording space is available to record the desired program, the system is automatically programmed to record the desired program at step 168.

Returning back to decision block 156, if it is determined that the tag is not a prioritization tag, execution proceeds to decision block 170 for a determination as to whether or not sufficient recording space is available on the storage device to record the desired program. If it is determined that the available recording space is insufficient to record the desired program, the viewer is notified at step 172 that there is insufficient recording space to record the desired program. Alternatively, if it is determined at decision 170 that sufficient recording space is available on the storage device, the system is automatically programmed to record the desired program at step 168.

Post-Recording Storage Optimization

Once recorded, the intelligent disk recording and management system selectively maintains the programs on the storage device through the use of tags that identify the programs. The tags enable the recorded programs to be prioritized, which allows for an automatic determination as to whether or not to record over a previously recorded program and which previously recorded program to record over.

Tags also may be assigned to recorded programs to identify whether a program is only partially recorded or to identify which portion of a recorded program has been viewed. Therefore, additional space is made available for new programs on the storage device by recording over the partial programs and previously viewed portions of programs. Furthermore, as explained above, assigning a tag to a recorded program to save the program until a specified date more efficiently uses the space on a storage device. After the appointed date, the program is deleted or can be recorded over to create additional space for recording new programs. Also, a "bucket size" can be created to ensure that a repeating program does not fill a disproportionate amount of disk space and yet allows for a minimum number of episodes to be maintained once the bucket size is met, as explained above.

Figure 8:
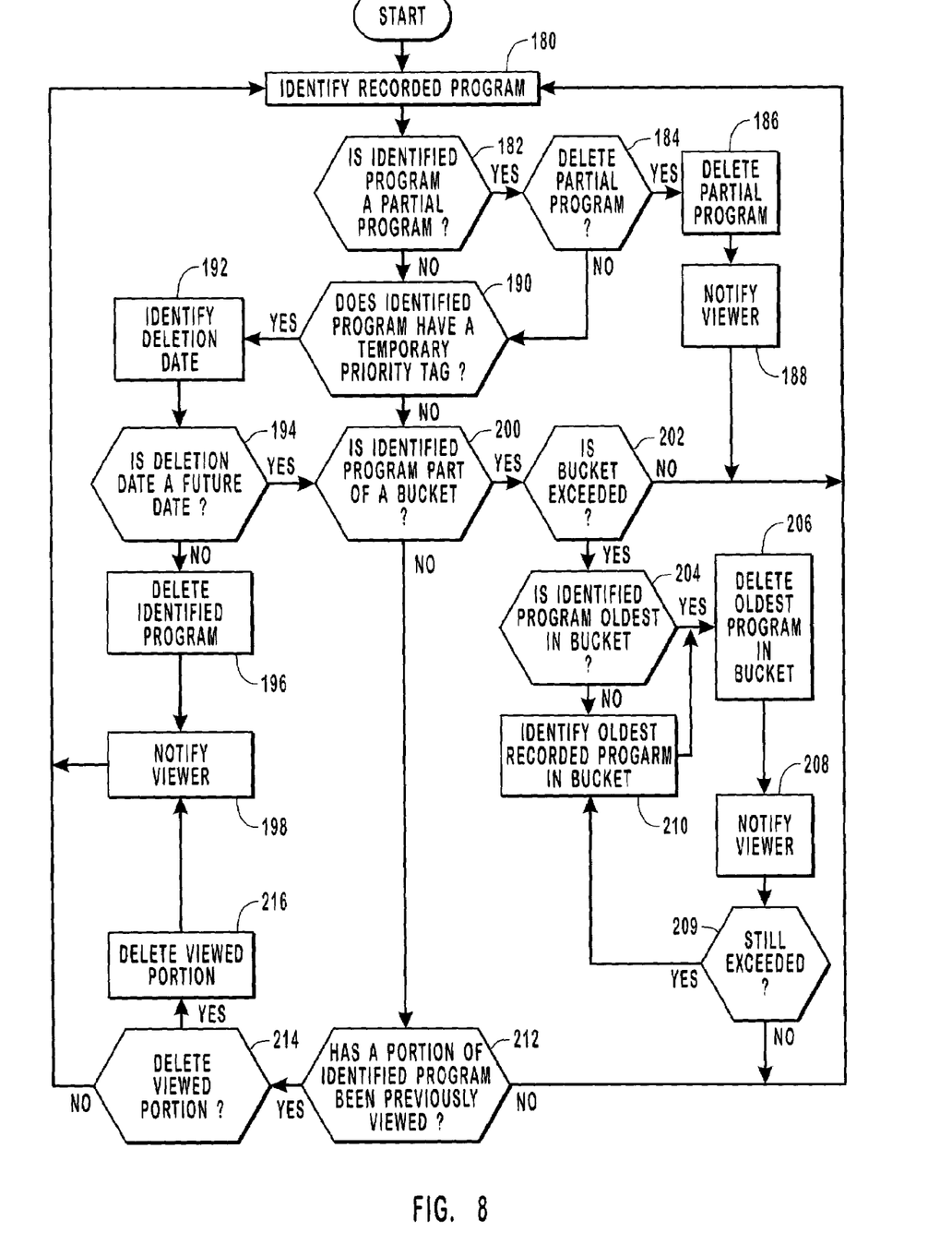
FIG. 8 is a flow chart that illustrates an exemplary embodiment for optimizing the availability of recording storage space after one or more requested programs have been recorded.

Therefore, with reference to FIG. 8, a flow chart is illustrated that provides an exemplary embodiment for optimizing recording storage space after one or more requested programs have been recorded. The system executes the flow of FIG. 8 to automatically maintain an efficient use of space on a storage device, thereby optimizing the amount of space available for recording new programs while storing desired recorded programs. The illustrated embodiment provides an example of applying storage rules to tags to determine when to delete or overwrite a program that was previously recorded. Furthermore, the illustrated embodiment may be performed by the system when a new program is to be recorded, be performed on a continual basis to maintain optimal use of storage space, and/or be performed at any time even if there is no immediate need to free up storage space.

In the embodiment of FIG. 8, execution begins at step 180 where a recorded program is identified on the mass storage device and a determination is made at decision block 182 as to whether or not the identified program is a partial program. As explained above, a partial program is a program that has not been recorded in its entirety. If it is determined at decision block 182 that the identified program is a partial program, execution proceeds to decision block 184 for a determination as to whether or not to delete the identified partial program to create additional space. If it is determined that the identified partial program is to be deleted, the program is deleted at step 186 and a viewer is notified at step 188 that the program was a partial program and was deleted. Execution then proceeds back to step 180 for the identification of another recorded program stored on the storage device. Alternatively, if it is determined at decision block 184 that the identified partial program is not to be deleted, execution proceeds to decision block 190.

Returning back to decision block 182, if it is determined that the identified program is not a partial program, execution proceeds to decision block 190 for a determination as to whether or not the identified program has a temporary priority tag. A temporary priority tag indicates the length for which the program is to be saved on the storage device. The length is determined by a deletion date that may be established when the system is programmed, when the program is recorded, or after the program is recorded. The temporary priority tag is a "save until" feature that may be automatically set by the system or may be manually set by a viewer. Therefore, if it is determined at decision block 190 that the identified program has a temporary priority tag was assigned to the identified program, execution proceeds to step 192 for the identification of the delete date indicated in the temporary priority tag and then to decision block 194 for a determination as to whether or not the deletion date is a future date. If the deletion date is a future date, execution proceeds to decision block 200. Alternatively, if the deletion date is not a future date, the identified program is deleted or allowed to be recorded over at step 196 and the viewer is notified at step 196 that the identified program has been deleted. Execution then proceeds back to step 180 for the identification of another recorded program on the mass storage device.

Returning back to decision block 190, if it is determined that the identified program does not include a temporary priority tag, execution proceeds to decision block 200 for the determination as to whether or not the identified program is part of a bucket. As explained above, a bucket allows a viewer to establish the number of related programs or episodes or the duration of related programs that will be stored on the mass storage device. If it is determined that the identified program is part of a bucket, execution proceeds to decision block 202 for a determination as to whether or not the bucket value is exceeded. If it is determined that the bucket value is not exceeded, execution returns back to step 180 for the identification of another recorded program.

Alternatively, if it is determined at decision block 202 that the bucket value is exceeded, execution proceeds to decision block 204 for a determination as to whether or not the identified program is the oldest program in the bucket. As one example, programs are removed from a bucket when they are determined to be the oldest and the bucket value is exceeded. The oldest program in the bucket is the program that was first recorded on the mass storage device. Therefore, if it is determined that the identified program is the oldest program in the bucket, execution proceeds to step 206, where the oldest program in the bucket is deleted and to step 208, where the viewer is notified that the program was deleted. Execution proceeds to decision block 209 for a determination as to whether or not the bucket value is still exceeded. If the bucket value is not still exceeded, execution returns back to step 180 for the identification of another recorded program on the mass storage device. Alternatively, if it is determined that the bucket value is still exceeded, execution proceeds to step 210 to identify the oldest recorded program in the bucket and to step 206 to delete the oldest recorded program in the bucket. This process is continued until the bucket size is no longer exceeded.

Returning back to decision block 204, if it is determined that the identified program is not the oldest program in the bucket, execution proceeds to step 210 to identify the oldest recorded program in the bucket. Execution then proceeds to step 206 to delete the oldest program in the bucket and to step 208 to notify the viewer of the deletion. As explained above, once a viewer is notified of the deletion at step 208, execution proceeds to decision block 209 to determine whether or not the bucket value is still exceeded. If the bucket value is not still exceeded, execution returns to step 180 for the identification of another recorded program. Alternatively, if it is determined that the bucket value is still exceeded, execution returns back to step 210 for the identification of the oldest recorded program in the bucket, to step 206 for the deletion of the oldest program in the bucket, and then to step 208 to notify the viewer of the deletion. As above, this process is continued until the bucket size is no longer exceeded.

Returning back to decision block 200, if it is determined that the identified program is not a part of a bucket, execution proceeds to decision block 212 for a determination as to whether or not a portion of the identified program has been previously viewed. If it is determined that a portion of the identified program has not been previously viewed, execution returns back to step 180 for an identification of another recorded program. Alternatively, if it is determined that a portion of the identified program has been previously viewed, execution proceeds to decision block 214 for a determination as to whether or not to delete the viewed portion.

If it is determined that the viewed portion is not to be deleted, execution returns back to step 180 for the identification of another recorded program on the mass storage device. Alternatively, if it is determined at decision block 214 that the viewed portion of the identified program should be deleted, the viewed portion is deleted at step 216, the viewer is notified at step 198 of the deletion, and execution returns back to step 180 for the identification of another recorded program on the mass storage device.

Thus, as explained above, embodiments of the present invention relate to the use of an intelligent disk recording and management system for selectively and intelligently tagging programs that a viewer desires to have recorded on a storage device to indicate the manner or priority for recording the programs in order to optimize the use of the storage space, and for selectively and intelligently eliminating programs that have been recorded to optimize the availability of storage space. The tags are automatically assigned based on known user preferences or are assigned by the viewer, and can be changed after the program has been replayed. Once recorded, the system uses tags to selectively and intelligently eliminate or store programs on the storage device to allow the storage space to be more efficiently and optimally used. The system further includes an interface that provides improved assistance and explanations to a viewer that relate to the recording of programs and the maintaining of recorded programs on a storage device. Furthermore, any or all of the foregoing program recording and disk management techniques can be combined as desired.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. In a video data recording system that is associated with a television on which a program can be displayed and includes a storage device for storing video data associated with the program, a method for optimizing the use of available storage space on the storage device, the method comprising the acts of:
   receiving a request by a viewer for the system to record a first program on the storage device;
   upon receiving the request from the viewer to record the first program, selectively assigning a first tag to said first program, wherein said first tag is used by the system to control, at least in part, recording of said first program, said first tag including at least one of a guaranteed tag, an optional tag or a priority tag, each of the guaranteed, optional and priority tags corresponding to different criteria for recording said program;
   applying recording rules to said first tag to determine whether the request to record said first program is to be fulfilled; and
   if it is determined that the request is to be fulfilled, automatically programming the system to record the first program on the storage device.

2. A method as recited in claim 1, wherein said first tag is automatically assigned by the system.

3. A method as recited in claim 1, wherein viewer input input received by the system assigns said first tag to said first program.

4. A method as recited in claim 1, further comprising informing said viewer when insufficient space is available on the storage device to record said first program.

5. A method as recited in claim 1, wherein said first tag is a guaranteed tag for causing sufficient recording space on the storage device to be reserved when said request is received for recording said first program on the storage device as opposed to a time at which said first program is broadcast to the system.

6. A method as recited in claim 5, wherein:
   said act of applying recording rules to the first tag to determine whether the request to record the first program is to be fulfilled comprises determining, at a time when said request is received, whether said sufficient storage space is available on the storage device to record said first program; and
   said act of automatically programming the system to record the video data associated with said first program on the storage device comprises:
      reserving said sufficient storage space for the recording of said first program if said sufficient storage space is available; and
      automatically programming the system to record said first program in said sufficient storage space when said first program is broadcast.

7. A method as recited in claim 6, wherein if said sufficient storage space is not available, the method further comprises informing said viewer that insufficient storage space is available on the storage device to record said first program.

8. A method as recited in claim 1, wherein said first tag is an optional tag for causing said first program to be recorded on the storage device if sufficient storage space exists on the storage device when said first program is broadcast.

9. A method as recited in claim 8, wherein:
   said act of applying recording rules to the first tag to determine whether the request to record the first program is to be fulfilled comprises determining, at the time when said first program is to be broadcast, whether sufficient storage space is available on the storage device to record said first program; and
   said act of automatically programming the system to record the video data associated with said first program on the storage device comprises recording said first program on the storage device if said sufficient storage space is available when said first program is broadcast.

10. A method as recited in claim 9, wherein if said sufficient storage space is not available when said first program is to be broadcast the method further comprises informing said viewer that insufficient storage space is available on the storage device to record said first program.

11. A method as recited in claim 1, wherein said first tag identifies a first priority for recording said first program.

12. A method as recited in claim 11, further comprising the acts of:
   receiving a request for the system to record a second program on the storage device; and
   selectively assigning a second tag to said second program to identify a second priority for recording said second program on the storage device.

13. A method as recited in claim 12, wherein when storage space available on the storage device is only sufficient to store data associated with one of said first program and said second program, the method further comprises the acts of:
   determining which of said first priority and said second priority is a higher priority; and
   overwriting said first program with said second program if said second priority is higher than said first priority.

14. A method as recited in claim 13, wherein if said first priority is a higher priority, the method further comprises the net of informing said viewer that insufficient space is available on the storage device to record said second program.

15. A method as recited in claim 11, further comprising the acts of:
   comparing said first priority with a third priority corresponding to a third tag assigned to a previously recorded program stored on the storage device;
   determining which of said first priority and said second priority is a higher priority; and
   if said first priority is a higher priority, recording said first program over said previously recorded program.

16. A method as recited in claim 1, further comprising the act of recording said first program on the storage device.

17. A method as recited in claim 16, further comprising the acts of:
   applying storage rules to said first tag to determine when said first program is to be deleted from the storage device; and
   deleting said first program from the storage device.

18. In a video data management system that is associated with a television on which a program can be displayed and includes a storage device for storing video data associated with one or more recorded programs, a method for optimizing the availability of storage space on the storage device, the method comprising the acts of:

selectively assigning a first tag to a first recorded program to identify a first priority for maintaining said first recorded program on the storage device, wherein the first priority of the first tag changes after the first recorded program is viewed on the system;

determining whether said first recorded program is a partially recorded program;

automatically applying storage rules to said first tag to determine whether to delete said first recorded program from the storage device, wherein it is determined that said first recorded program should be deleted when the first recorded program is a partially recorded program or when the priority of the first tag changes; and if it is determined that said first recorded program is to be deleted from the storage device, automatically deleting said first recorded program from the storage device.

19. A method as recited in claim 18, wherein: said act of applying recording rules to said first tag comprises:

indicating that said first recorded program is to be overwritten when a second program is recorded on the storage device if said first recorded program is a partial program.

20. A method as recited in claim 19, wherein if said first recorded program is a partial program, the method further comprises notifying a viewer that said first recorded program is to be overwritten when a second program is recorded on the storage device.

21. A method as recited in claim 18, wherein if said first tag includes a time for deletion, the method further comprises deleting said first recorded program from the storage device at said deletion time.

22. A method as recited in claim 18, further comprising the acts of:

determining whether said first recorded program is included in a defined bucket of related programs; and if said first recorded program is included in said defined bucket, further performing the acts of:
    determining a bucket size allocated for said bucket;
    determining whether said bucket size is exceeded; and
    deleting one or more recorded programs on the storage device if said bucket size is exceeded.

23. An intelligent recording and management system for recording and managing video data on a storage device, the system comprising:

a receiver for receiving a signal carrying programming;

a recording device coupled to said receiver for selectively recording video data corresponding to a program of said programming based on a recording tag assigned to said program and recording rules that determine whether said program is to be recorded, wherein said recording device includes means for:

receiving a request by a viewer for the system to record the program on the storage device;

upon receiving the request from the viewer to record the program, selectively assigning a tag to the program, wherein said tag is used by the system to control, at least in part, recording of said program, said tag including at least one of a guaranteed tag, an optional tag or a priority tag, each of the guaranteed, optional and priority tags corresponding to different criteria for recording said program;

applying the recording rules to said tag to determine whether the request to record said program is to be fulfilled; and if it is determined that the request is to be fulfilled, automatically programming the system to record video data associated with the program on the storage device;

a storage device coupled to said recording device for storing said recorded video data based on a storage tag assigned to said recorded video data and storage rules that determine whether said recorded video data is to be deleted; and an interface coupled to said recording device for informing a viewer.

24. A system as recited in claim 23, wherein said interface informs said viewer as to an amount of space that is available on said storage device for storing video data.

25. A system as recited in claim 23, wherein said interface informs said viewer of recording said video data corresponding to said program on said storage device.

26. A system as recited in claim 23, wherein said interface informs said viewer of deleting said recorded video data from said storage device.

27. A system as recited in claim 23, wherein said interface informs said viewer as to why only a portion of said video data was recorded on said storage device.

28. A method as recited in claim 7, wherein subsequent to the user being notified there is insufficient space to record the first program, the method further includes changing the priority of the first tag and recording the first program over other programming stored in the storage device.

29. A method as recited in claim 1, wherein the first tag includes the priority tag as well as at least one of the optional tag and the guaranteed tag.

* * * * *